(No Model.)
D. ABLE & E. GROSS.
WHIFFLETREE.
No. 529,673. Patented Nov. 20, 1894.
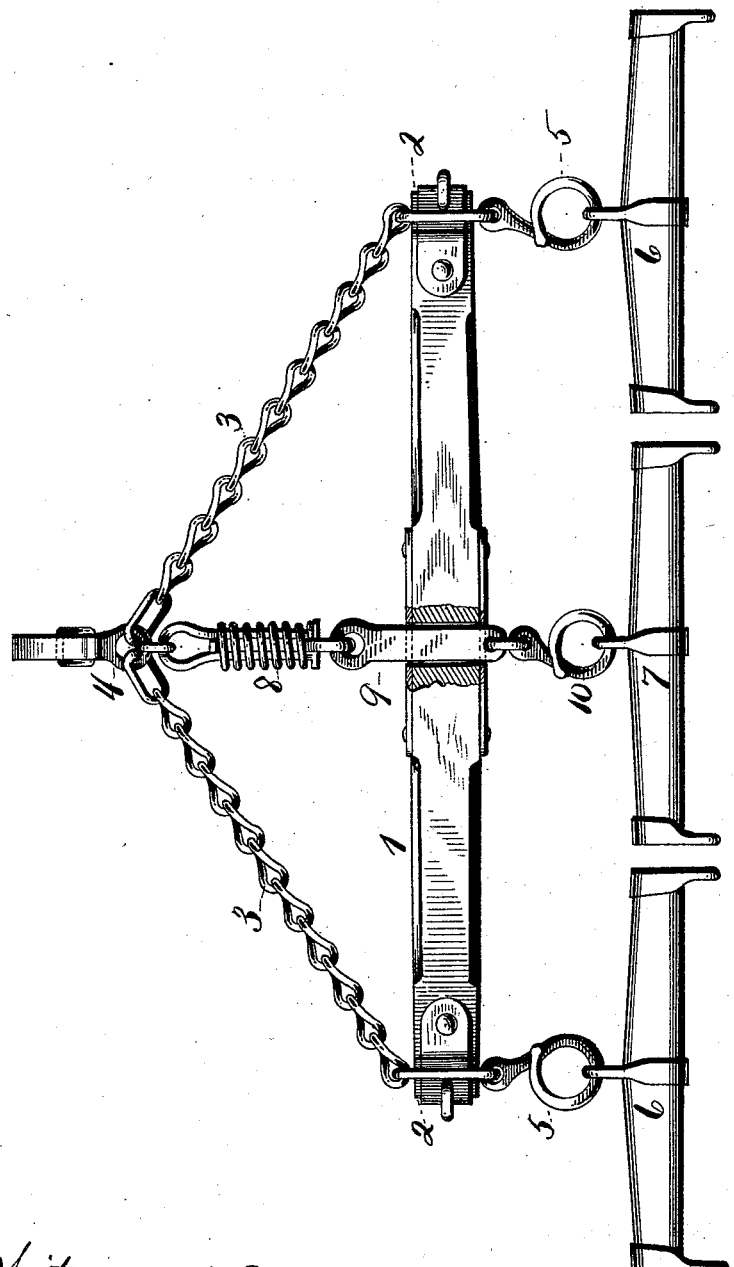

UNITED STATES PATENT OFFICE.

DAVID ABLE AND ELI GROSS, OF MANCHESTER, PENNSYLVANIA, ASSIGNORS, BY DIRECT AND MESNE ASSIGNMENTS, OF ONE-HALF TO WILLIAM S. SCHROLL, OF SAME PLACE.

WHIFFLETREE.

SPECIFICATION forming part of Letters Patent No. 529,673, dated November 20, 1894.

Application filed September 12, 1894. Serial No. 522,811. (No model.)

*To all whom it may concern:*

Be it known that we, DAVID ABLE and ELI GROSS, citizens of the United States, residing at Manchester, in the county of York and State of Pennsylvania, have invented certain new and useful Improvements in Whiffletrees; and we do declare the following to be a full, clear, and exact description of the invention, such as will enable others skilled in the art to which it appertains to make and use the same, reference being had to the accompanying drawing, and to the figures of reference marked thereon, which forms a part of this specification.

Our invention relates to double-trees adapted for ready attachment to plows, cultivators and other objects to be drawn; and it has for its object to provide a double tree of a particular construction in which the two end horses will pull through or by means of diagonally extending chains coupled to the plow or cultivator or other object, and the middle horse will pull through a spring connection located between said chains in the center line of draft, said spring connection having a part thereof passing through the double tree and to the forward end of which part is coupled the middle single tree, by reason of which construction a great deal of strain is taken from off the middle horse and the draft is more evenly equalized for each of the horses.

To the accomplishment of the foregoing ends the invention consists in the construction and combination of parts hereinafter particularly described and then sought to be specifically defined by the claims reference being had to the accompanying drawing forming a part hereof and in which is illustrated a plan view of a double tree attachment embodying our invention, a portion of the double tree being broken away to show the passage through it of a portion of the spring connection for the middle horse.

In the drawing the numeral 1 designates a double tree having at its opposite ends the links 2 swiveled thereto in the ordinary way and from the rear of which extends the two draft chains 3 which extend diagonally and at their inner ends are connected with a hook 4 by means of which coupling is made with a plow, cultivator or other object to be drawn. To the forward ends of the swiveled links 2 are attached the hooks 5 by means of which the end single trees 6 are coupled to the double tree. The two end horses pull from the point of attachment or coupling of the double tree to the cultivator or other object through the chains 3, the pull being equalized through the double tree 1 in the ordinary way. Instead of coupling or hooking the single tree 7 for the middle horse to the double tree 1 so that the draft or pull will be through the double tree and draft chains 3, we connect the single tree 7 in a straight line with the coupling hook 4 by means of a spring connection so that the center draft of the middle horse will be in a straight line from the point of coupling to the cultivator or plow or other object, the strain on the horse being relieved by means of the direct spring connection between the single tree and the coupling hook 4. In order to effect this, a spring 8 of any suitable and approved pattern is interposed between the middle single tree and the coupling hook, and we prefer to have a rod or plate 9 connected at one end to the spring 8 and passed through the double tree 1 and coupled with the middle tree 7 by means of a hook 10 so that said bar or rod 9 will have a sliding movement through the double tree. By this feature of construction the middle horse is caused to pull in a direct line from the point of attachment of the coupling hook 4 with the cultivator or plow and any side or lateral pulling by the horse is prevented as the passage of the rod or plate 9 through the double tree guides the plate or rod in a straight line and thus insures the direct pull in the line of draft. The draft chains 3 between the double tree 1 and coupling hook 4 equalize the pull or draft between the two end horses which is left unaffected by the pull of the middle horse as that is caused to be in a direct line with the coupling hook 4 and by direct connection of the middle single tree with that hook so that each of the three horses is caused to pull through independent connections with the coupling hook 4 which would not be the case if the middle single tree was connected with the double tree so as to pull through the double tree. From the particular construction and arrangement of parts which we have devised and illustrated the three horses are caused to pull with greater freedom and ease than under other constructions and the labor of each horse is lightened materially as has been demonstrated in the actual working of this invention.

The drawing illustrates three single trees connected to the double tree but by removal of the middle single tree and replacement of the two end trees with longer trees and the coupling of additional trees to them the device will be adapted for the hitching of four or more horses through this attachment, but in such event the advantages resulting from employment of the spring 8 and sliding bar or rod 9 will not be attained as under those circumstances the coupling of a tree to the middle hook 10 will have to be dispensed with. This is mentioned however merely for the purpose of illustrating the varied applications of the attachment.

This double tree attachment can be made at comparatively little cost as it is composed of few parts all of which are simple in construction.

We have illustrated and described what we consider to be the best construction of the details of the several parts but it is obvious that changes can be made without departing from the essential features of the invention.

Having described our invention and set forth its merits, what we claim is—

1. The combination of the double tree provided with means for the attachment of a single tree to each end thereof, the draft chains extending from the end of the double tree and connecting with coupling means, a spring device intermediate of said draft chains and said double tree and having connection at one end with the coupling means and adapted to have a single tree attached to its other end, substantially as and for the purposes described.

2. The combination of the double tree, provided with means for the attachment of a single tree to each end thereof, draft chains connected at one end with the double tree and provided at the other end with means for coupling to the object to be drawn, the plate or rod passing loosely through the double tree and provided at one end with means for attachment of a middle tree, and the spring connected at one end to said plate or rod and at the other end with said coupling means, substantially as and for the purposes described.

In testimony whereof we affix our signatures in presence of two witnesses.

DAVID ABLE.
ELI GROSS.

Witnesses:
MICHAEL GROSS,
GEO. D. SCHRIVER.

Correction in Letters Patent No. 529,673.

It is hereby certified that Letters Patent No. 529,673, granted November 20, 1894, for an improvement in "Whiffletrees," was erroneously issued to both inventors, David Able and Eli Gross, and William S. Schroll, as joint owners of said invention; whereas the patent should have been granted to said *Eli Gross and William S. Schroll*, as sole owners of the entire interest as shown by the assignments of record in the Patent Office; and that the said Letters Patent should be read with this correction therein that the same may conform to the record of the case in the Patent Office.

Signed, countersigned, and sealed this 27th day of November, A. D. 1894.

[SEAL.]

JNO. M. REYNOLDS,
*Assistant Secretary of the Interior.*

Countersigned:
  JOHN S. SEYMOUR,
    *Commissioner of Patents.*